United States Patent [19]

Mitsuki

[11] Patent Number: 4,870,505

[45] Date of Patent: Sep. 26, 1989

[54] METHOD OF AND APPARATUS FOR CONNECTING OUTPUT IMAGE SIGNALS FROM A PLURALITY OF LINE IMAGE SENSORS USING A CORRECTION READ PATTERN

[75] Inventor: Kiyoomi Mitsuki, Kyoto, Japan

[73] Assignee: Dainippon Screen Mfg. Co., Ltd., Japan

[21] Appl. No.: 170,791

[22] Filed: Mar. 21, 1988

[30] Foreign Application Priority Data

Mar. 24, 1987 [JP] Japan .................................. 62-69393

[51] Int. Cl.$^4$ .............................................. H04N 1/04
[52] U.S. Cl. ..................................... 358/494; 358/294; 358/285; 358/471; 358/474
[58] Field of Search ............... 358/285, 293, 294, 280

[56] References Cited

U.S. PATENT DOCUMENTS

| | | | |
|---|---|---|---|
| 4,356,513 | 10/1982 | Yoshimura et al. ................. | 358/294 |
| 4,459,619 | 7/1984 | Yoshida ............................... | 358/294 |
| 4,465,939 | 8/1984 | Tamura ................................ | 358/294 |
| 4,675,745 | 7/1987 | Suzuki ................................. | 358/294 |
| 4,692,812 | 9/1987 | Hirahara et al. .................... | 358/294 |
| 4,712,134 | 12/1987 | Murakami ........................... | 358/294 |

*Primary Examiner*—Howard W. Britton
*Assistant Examiner*—Kim Yen Vu
*Attorney, Agent, or Firm*—Ostrolenk, Faber, Gerb & Soffen

[57] ABSTRACT

An amount of a read position error in the subscanning direction between line image sensors (for example, CCD1, CCD2, CCD3) is obtained by initially scanning and reading a correction read pattern (6a, 6b). In scanning of an original, output image signals from the line image sensors (CCD1, CCD2, CCD3) are relatively delayed by a line number corresponding to the amount of the read position error between the line image sensors (CCD1, CCD2, CCD3), to correct time difference, caused by the read position error, in information reading in the boundary portion of the line image sensors. An arrangement of line memories is also provided for correcting angular deviations of the line image sensors.

11 Claims, 9 Drawing Sheets

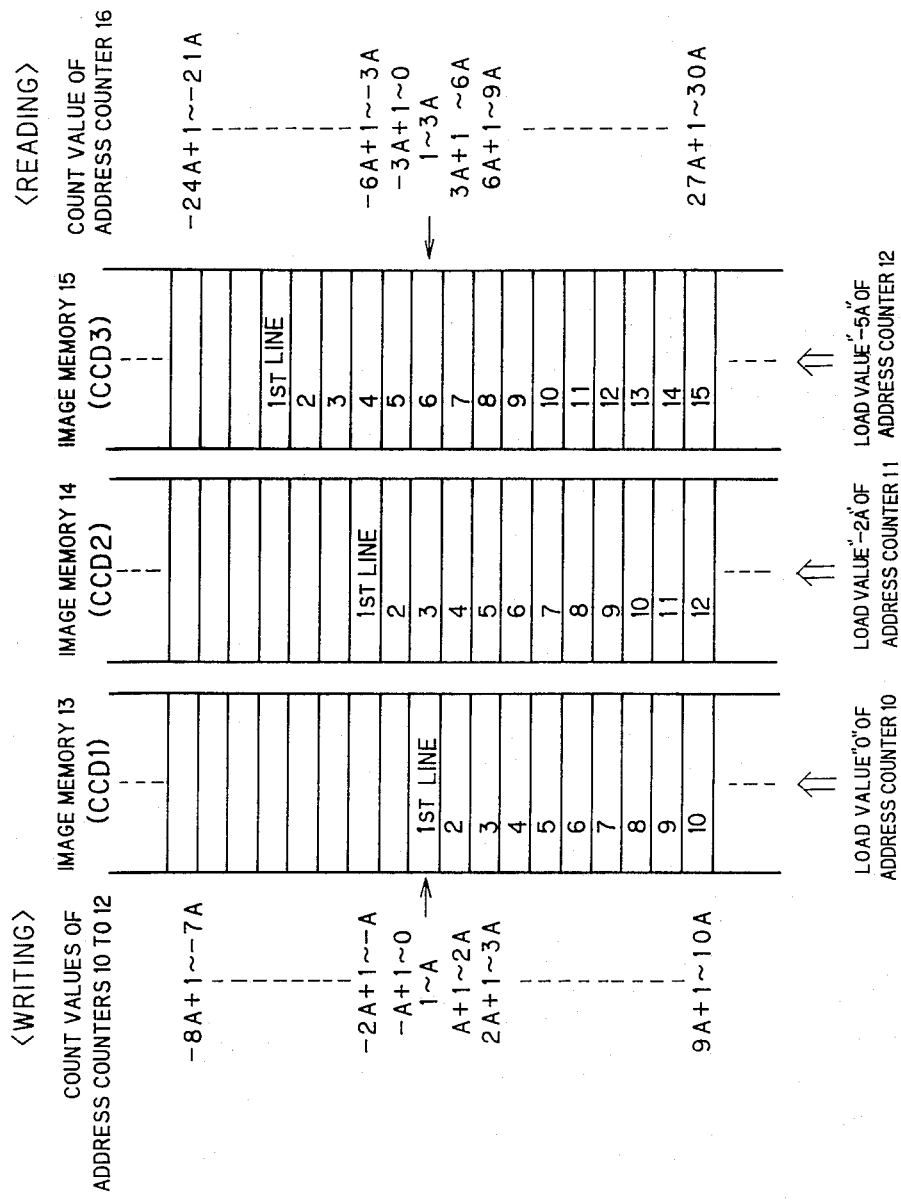

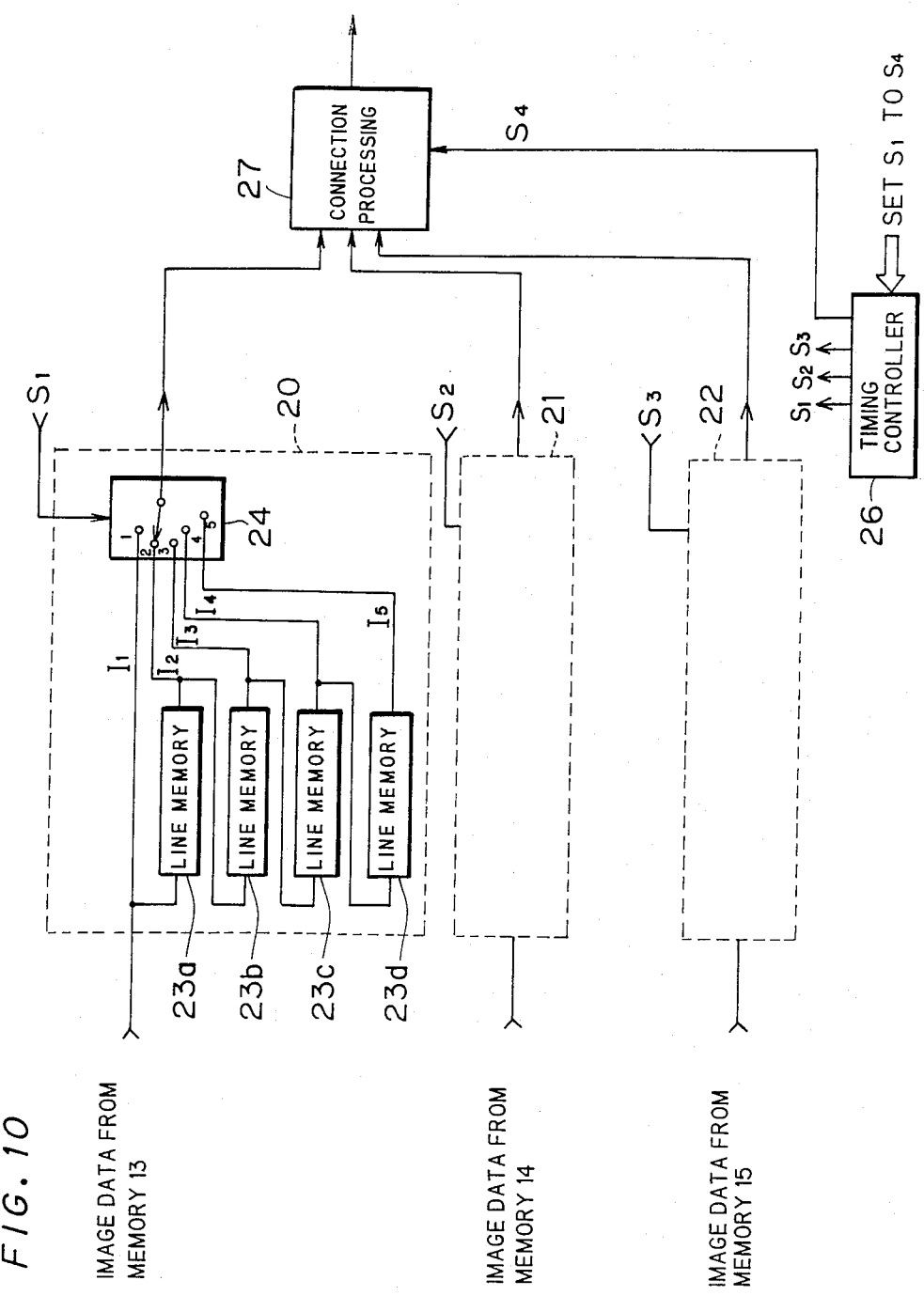

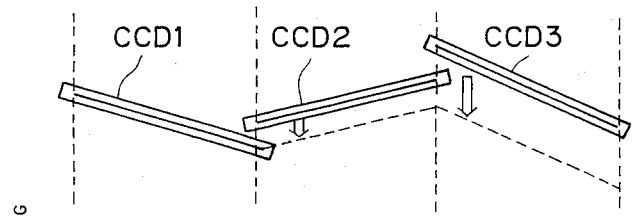
FIG. 11(a)
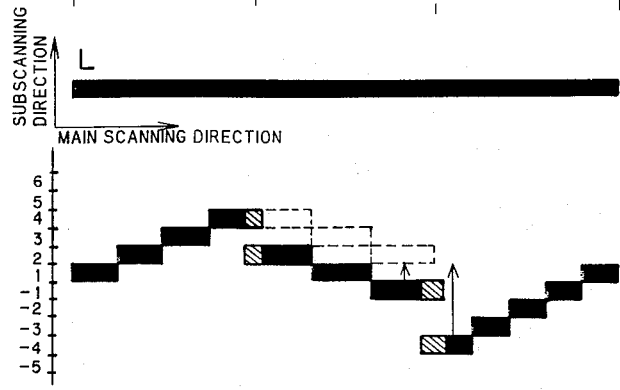
FIG. 11(b)
FIG. 11(c)
FIG. 11(d)
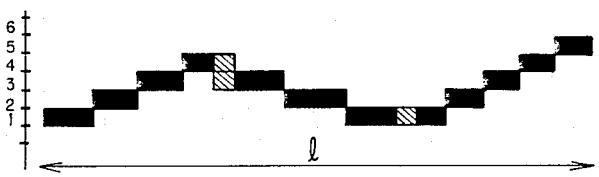
FIG. 11(e)
FIG. 11(f)
FIG. 11(g)
FIG. 11(h)
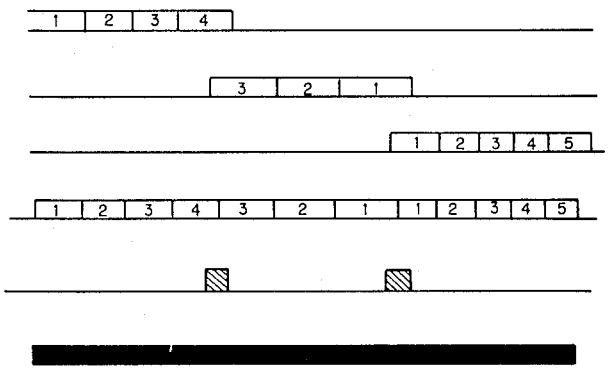
FIG. 11(i)
FIG. 11(j)

METHOD OF AND APPARATUS FOR CONNECTING OUTPUT IMAGE SIGNALS FROM A PLURALITY OF LINE IMAGE SENSORS USING A CORRECTION READ PATTERN

BACKGROUND OF THE INVENTION

1. Field of the Invention

The present invention relates to a method and an apparatus for associating output image signals from a plurality of line image sensors, which are arrayed along a main scanning line in a main scanning direction for scanning an original and obtaining image information, by correcting any errors in the respective reading positions of the line image sensors, caused by the sensors being displaced away from the main scanning line.

2. Description of the Prior Art

In the case where a large screen must be read with high resolution for reading a design drawing or a map, or in the case where an original must be read with extremely high resolution in the field of electronic process printing for commercial printing, a plurality of line image sensors are generally arrayed along a main scanning line extending in a main scanning direction to divide the screen along the main scanning direction into a large number of pixels. Each respective line image sensor must read image information on the same main scanning line. It is difficult, however, to accurately situate the line image sensors to correctly perform reading on exactly the same main scanning line. Even if exact positioning is achieved during the manufacturing process, it is substantially impossible to maintain mechanical accuracy due to vibrations during transportation, time change, temperature change, itc.

Since the respective image sensors are generally arrayed so that their read positions on a scanning plane partially overlap each other, an error in a read position along the main scanning direction can be absorbed to some extent, and hence no significant problem is caused. However, if such an error is caused by displacement of a sensor in the subscanning direction (transverse to the main scanning direction; see FIGS. 2 and 3) and if thin lines extending in the main scanning direction of the original are being read, the image that is being read may be interrupted. That is, connecting portions of said thin lines detected by the resepective line image sensors may become disconnected. This causes the image to be indented in the subscanning direction and degrades the picture quality.

SUMMARY OF THE INVENTION

The present invention is directed to a method and an apparatus for associating output image signals from a plurality of line image sensors, which are arrayed in the main scanning direction, for scanning an original and obtaining image information, by correcting any errors in the read positions of the respective line image sensors, so that continuous, connected line output data is outputted.

According to the present invention, a correction read pattern is provided for being read at the beginning of a correction process. The read pattern includes at least a first pattern wherein a subscanning direction coordinate is uniquely determinable with respect to a main scanning direction coordinate on a scanning plane. The first pattern intersects in at least two points with each scanning line portion, corresponding to each respective line image sensor.

In the correction process, the amount of the read position error in the subscanning direction between individual ones of the plurality of image sensors is first obtained, based on read pixel addresses as detected by the respective line image sensors in the initial scanning/reading of the first pattern by the respective line image sensors. Then, when the original is scanned, the output image signals from the respective line image sensors are each respectively delayed with respect to the other line image sensors by a respective line number corresponding to the read position error obtained in the subscanning direction, so as to connect the output image signals.

According to the present invention, the correction read pattern is scanned and read in the correction process to determine the amount of the read position error between the respective line image sensors in the subscanning direction, and then, when scanning an original, each of the output image signals from the respective line image sensors is relatively delayed with respect to the signals from the other line image sensors by a respective line number corresponding to the respective amount of the read position error. This will correct any time difference error, caused by the read position error, in reading line images in the boundary portion between the line image sensors.

Accordingly, an object of the present invention is to solve the aforementioned problem of the prior art and provide a method and an apparatus for associating the output image signals from a plurality of line image signals, which can easily correct any error in the read positions of such, particularly in the subscanning direction, with a simple structure, when an original is scanned by the plurality of line image sensors arrayed in the main scanning direction for obtaining image information, so that degradation in picture quality of the read image is effectively prevented.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an explanatory diagram showing the status of writing in image memories;

FIG. 10 is a block diagram showing a circuit for correcting irregularity in an image caused by angle deviation including connection processing in the main scanning direction; and FIGS. 11A-J are an explanatory diagram for the operation of the circuit shown in FIG. 10.

DESCRIPTION OF THE PREFERRED EMBODIMENT

Figure 1:
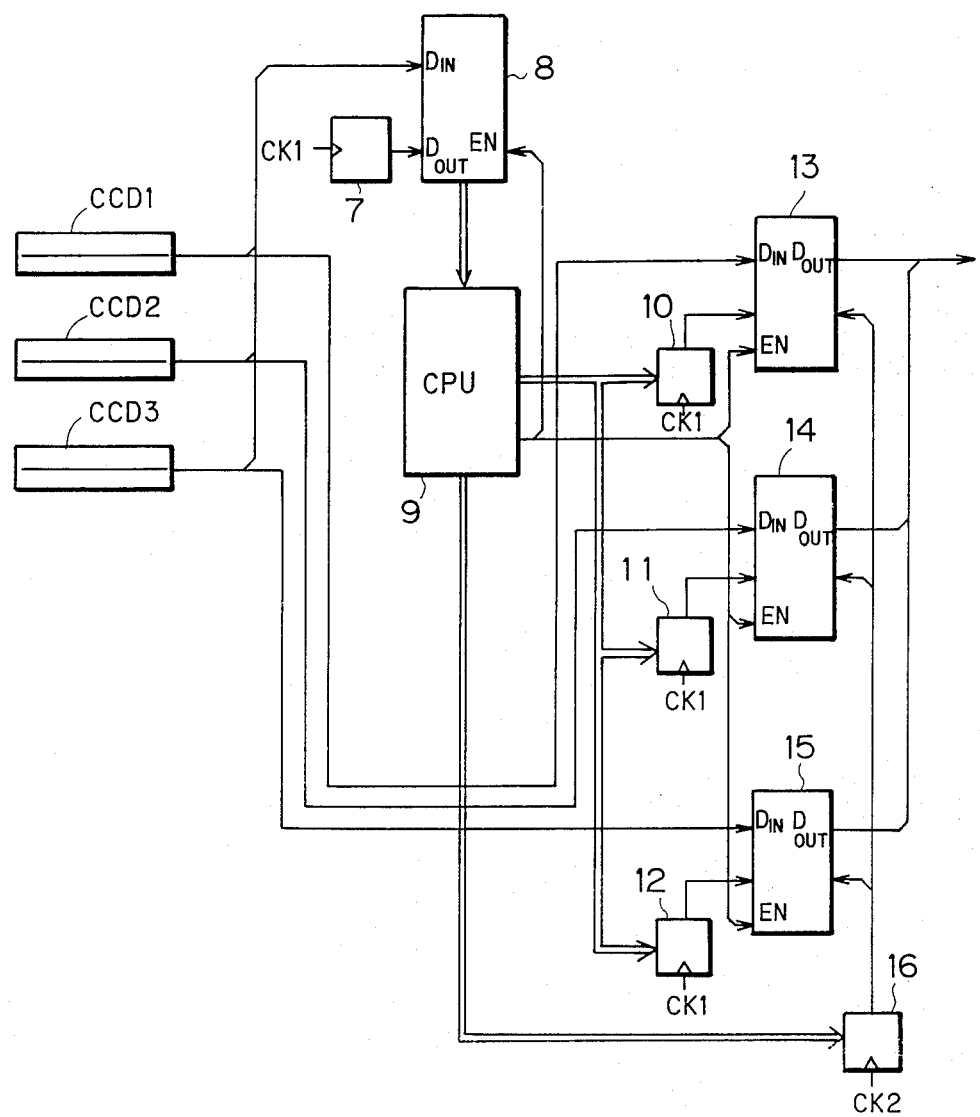
FIG. 1 is a schematic block diagram showing an embodiment of the present invention.

FIG. 1 is a block diagram showing an embodiment of an apparatus for associating ouput image signals from a plurality of line image sensors, according to the present invention. Referring to FIG. 1, three line image sensors (hereinafter referred to as CCD 1 to CCD 3) are shown. They are arrayed along a line extending in the maiin scanning direction so that their respective reading fields (read positions) on a scanning plane 4 (FIG. 2) partially overlap each other at regions where they are adjacent. A table 5 for supporting an original image to be scannned and a correction reference chart 6 are provided on the scanning plane 4. The chart 6 comprises correction read patterns 6a and 6b for use in the method of associating output signals from the sensors CCD 1 to CCD 3 with respect to main and subscanning directions (defined in FIG. 2) respectively.

Figure 3:
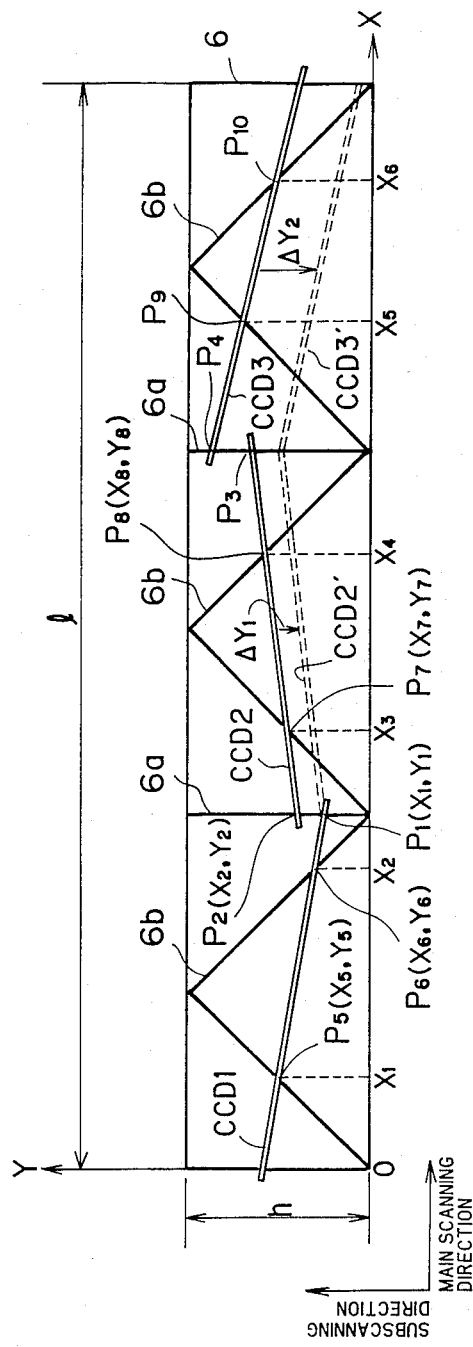
FIG. 3 is an explanatory diagram showing the positional relationship between the CCD's and the correction reference chart.

FIG. 3 illustrates an example of the positional relation between the sensors CCD 1 to CCD 3 relative to the correction reference chart 6. The CCD's 1 to 3 in this example are subjected to both an error in their location in the subscanning direction, and an angle deviation, as shown in FIG. 3. Referring also to FIG. 1, signals from the CCD 1 to CCD 3 reading the sensors correction reference chart 6 are written into a position error detecting memory 8 which is enabled by a CPU 9. The signals are written into addresses indicated by an address counter 7 synchronized with a write clock signals CK1. The CPU 9 performs connection (error correction) processing in the main scanning direction and causes the apparent location of sensors CCD 2 and CCD 3 to be adjusted by amounts $\Delta Y_1$ to $\Delta Y_2$ of to correct the position error in the subscanning direction on the basis of the data in the memory 8. Such processing will be hereinafter described in detail. In short, count values corresponding to line numbers, whiich correspond in turn to the amounts $\Delta Y_1$ and $\Delta Y_2$ of correction for position error in the subscanning direction, are loaded into address counters 10 to 12. When scanning an original, read signals generated by the CCD's 1 to 3 are written into image memories 13 to 15, respectively, at addresses identified by the address counters 10 to 12 which are synchronized with the write clock signal CK1. As a result, reading errors in the area of the boundary portions of the CCD's 1 and 3, which errors are caused by the location error of the CCD's 1 to 3 in the subscanning direction, are corrected. Then, image signals are sequentially read from the image memories 13 to 15 at addresses identified by an address counter 16 which is synchronized with a read clock signal CK2, to obtain completely connected image signals which are equivalent to those that would be obtained by scanning by means of sensors disposed at locations designated CCD 1, CCD 2' and CCD 3' (see FIG. 3 wherein the dashed lines show those sensors CCD 2' and CCD 3' whose location error in the subscanning direction is completely corrected).

With reference to FIG. 3, the error corrected processing in the main scanning direction and the processing for correcting position errors by the amounts $\Delta Y_1$ and $\Delta Y_2$ in the subscanning direction will now be described.

Figure 4:
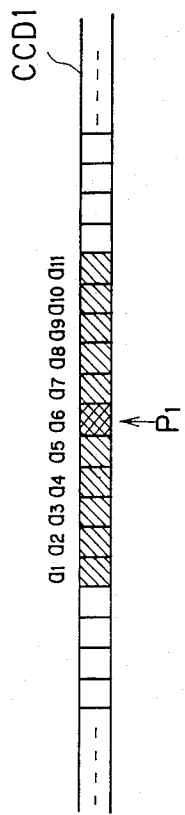
FIG. 4 is an explanatory diagram for explaining the detection of pixels by the CCD's when reading the correction reference chart.

First, error correction in the main scanning direction is performed, to making an address generated by a pixel of the CCD 1 reading a point $P_1$ identical to an address generated by a pixel of the CCD 2 reading a point $P_2$, and to make an address of a pixel generated by the CCD 2 reading a point $P_3$ identical to an address of a pixel generated by the CCD 3 reading a point $P_4$. This first error correction processing employs the correction read pattern 6a extending in the subscanning direction. Referring to FIG. 4, if a plurality of pixels $a_1$ to $a_{11}$ are generated by the CCD 1 actually reading the point $P_1$, for example, the central pixel $a_6$ is treated as the read pixel for the point $P_1$. The hatching in the pixels $a_1$ to $a_{11}$ in FIG. 4 indicates black levels in a bilevel data system comprising black levels and white levels.

Figure 5:
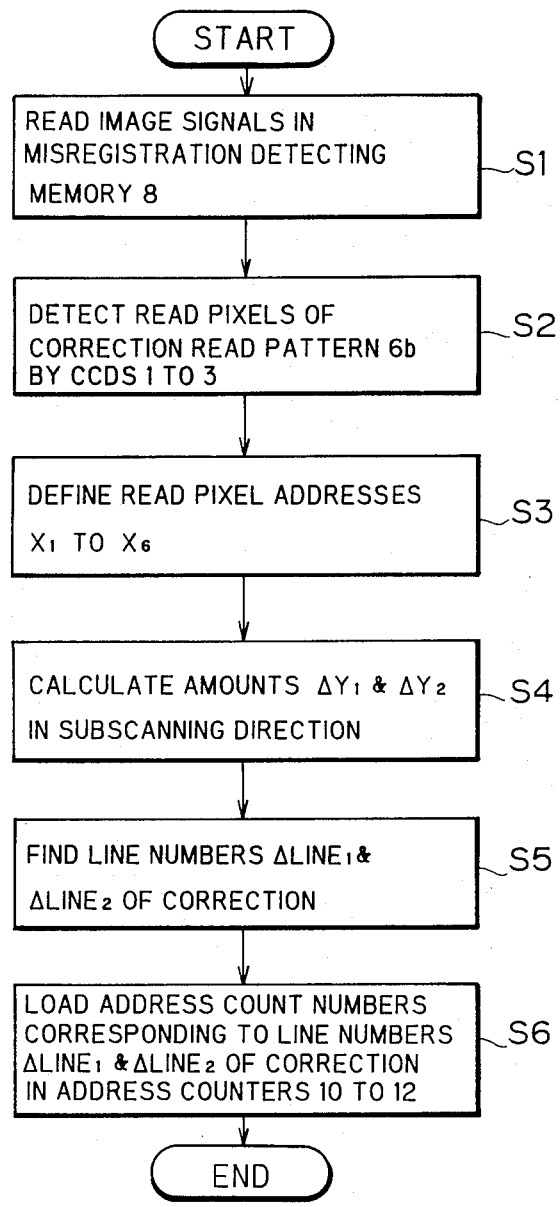
FIG. 5 is a flow chart showing the procedure of processing for operating amounts of a read position error in the subscanning direction.

FIG. 5 is a flow chart showing the procedure of followed by the CPU 9 for correcting position errors by the above-mentioned amounts $\Delta Y_1$ and $\Delta Y_2$ (FIG. 3) in the subscanning direction. At a step S1, signals from the sensors CCD 1 to CCD 3 reading the correction reference chart 6 are stored in the position error detecting memory 8, as hereinabove described. At a step S2, the CPU 9 detects pixels generated by the CCD's 1 to 3 reading of the correction read pattern 6b, i.e., pixels of black levels corresponding to points $P_5$ to $P_{10}$. At a subsequent step S3, the CPU 9 defines respective single read pixel addresses $x_1$ to $x_6$ in a similar manner to that shown in FIG. 4 and as described above.

At a step S4, the CPU 9 calculates the amounts $\Delta Y_1$ and $\Delta Y_2$ of correction in the subscanning direction by employing the pixel addresses $x_1$ to $x_6$ by the following expressions:

$$\Delta Y_1 = \frac{2h}{A} \cdot \left\{ \frac{(A - x_2 - x_1)(A - x_1)}{x_2 - x_1} - \frac{(3A - x_4 - x_3)(A - x_3)}{x_4 - x_3} + (A + x_1 - x_3) \right\} \quad (1)$$

$$\Delta Y_2 = \frac{2h}{A} \cdot \left\{ \frac{(A - x_2 - x_1)(A - x_1)}{x_2 - x_1} + \frac{(3A - x_4 - x_3)(A - X_3)}{x_4 - x_3} - \frac{(5A - x_6 - x_5)(2A - x_5)}{x_6 - x_5} + (2A + x_1 - x_5) \right\} \quad (2)$$

where A represents effective number of pixels generated by each of the respective CCD's 1 to 3, l represents the effective length in the main scanning direction and h represents the width of the correction reference chart 6 in the subscanning direction.

The process of deriving the above expression (1) is as follows: Considering an XY-coordinate system with an origin O as shown in FIG. 3, the quantities $x_1$ and $x_2$, which denote pixel addresses, are converted into lengths in the direction X from the origin O by obtaining X-coordinates $X_5$ and $X_6$ of the points $P_5$ and $P_6$. Since the main scanning direction effective length is l and the effective number of pixels corresponding thereto is 3A, the X-coordinates of the points $P_5$ and $P_6$ are as follows:

$$X_5 = (l/3A) \cdot x_1 \quad (3)$$

$$X_6 = (l/3A) \cdot x_2 \quad (4)$$

The correction read pattern 6b is a pattern in which the subscanning direction coordinates (Y-coordinates) are uniquely determined with respect to the main scanning direction coordinates (X-coordinates), and hence the Y-coordinates can be determined upon determination of the X-coordinates. The correction read pattern comprising a straight line which is 6b is a regular pattern repeatedly bent of intervals of 1/6 within the width h as shown in the FIG. 3. The Y-coordinates $Y_5$ and $Y_6$ corresponding to the X-coordinates $X_5$ and $X_6$ can be determined as follows:

$$Y_5 = 2hx_1/A \quad (5)$$

$$Y_6 = 2h(A - x_2)/A \quad (6)$$

Similarly, X-coordinates $X_7$ and $X_8$ and Y-coordinates $Y_7$ and $Y_8$ of points $P_7$ and $P_8$ are determined as follows:

$$X_7 = (l/3A) \cdot x_3 \quad (7)$$

$$X_8 = (l/3A) \cdot x_4 \quad (8)$$

$$Y_7 = 2h(x_3 - A)/A \quad (9)$$

$$Y_8 = 2h(2A - x_4)/A \quad (10)$$

An expression of a straight line passing through the two points $P_5$ and $P_6$ is as follows:

$$Y = \frac{Y_6 - Y_5}{X_6 - X_5}(X - X_5) + Y_5 \quad (11)$$

The value $X = l/3$ is substituted in the expression (11) to find the Y-coordinate $Y_1$ of the point $P_1$:

$$Y_1 = \frac{Y_6 - Y_5}{X_6 - X_5}\left(\frac{l}{3} - X_5\right) + Y_5 \quad (12)$$

the Y-coordinate $Y_2$ of the point $P_2$ is similarly found as follows:

$$Y_2 = \frac{Y_8 - Y_7}{X_8 - X_7}\left(\frac{l}{3} - X_7\right) + Y_7 \quad (13)$$

The correction amount of $Y_1$ is expressed as follows:

$$\Delta Y_1 = Y_1 - Y_2 \quad (14)$$

The expressions (12) and (13) are substituted in the expression (14) and the expressions (3) to (10) are further employed, to obtain the above expression (1). The expression (2) for calculating a correction amount $\Delta Y_2$ can also be derived in a similar manner to the above.

At a step S5 in FIG. 5, the correction amounts $\Delta Y_1$ and $\Delta Y_2$ found at the step S4 are divided by a scanning line pitch p on the scanning plane 4 to convert the same into line numbers, to find correction line numbers $\Delta LINE_1$ and $\Delta LINE_2$ corresponding to the correction amounts $\Delta Y_1$ and $\Delta Y_2$. The remainder of division by p may be raised to a unit if it exceed p/2, while being omitted if it is less than p/2.

At a subsequent step S6, the CPU 9 loads address count values corresponding to the correction line numbers $\Delta LINE_1$ and $\Delta LINE_2$ in the address counters 10 to 12. Assuming that one address corresponds to image data for one pixel in the image memories 13 to 15 for the purpose of simplification, respective load values in the address counters 10 to 12 are as follows:

| | |
|---|---|
| address counter 10 | 0 |
| address counter 11 | $A \times \Delta LINE_1$ |
| address counter 12 | $A \times \Delta LINE_2$ | where A represents the effective pixel number of the respective CCD's 1 to 3, as hereinabove described. The load value in the address counter 10 may not be 0, if the load values of the address counter 11 and 12 relatively hold difference of $A \times \Delta LINE_1$ and $A \times \Delta LINE_2$ with respect to the load value of the address counter 10, respectively.

Figure 2:
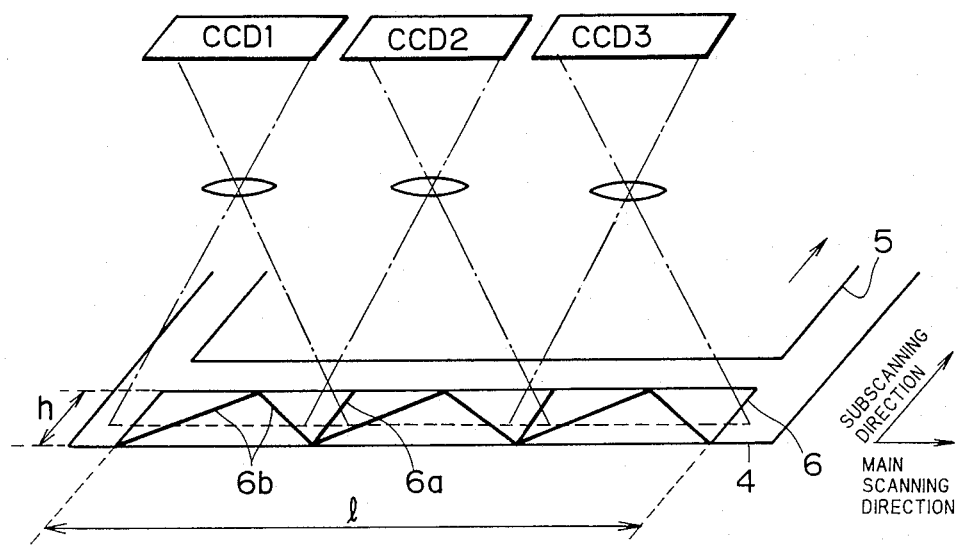
FIG. 2 is an explanatory diagram showing an array of CCD's and a correction reference chart (test pattern)
Figure 9:
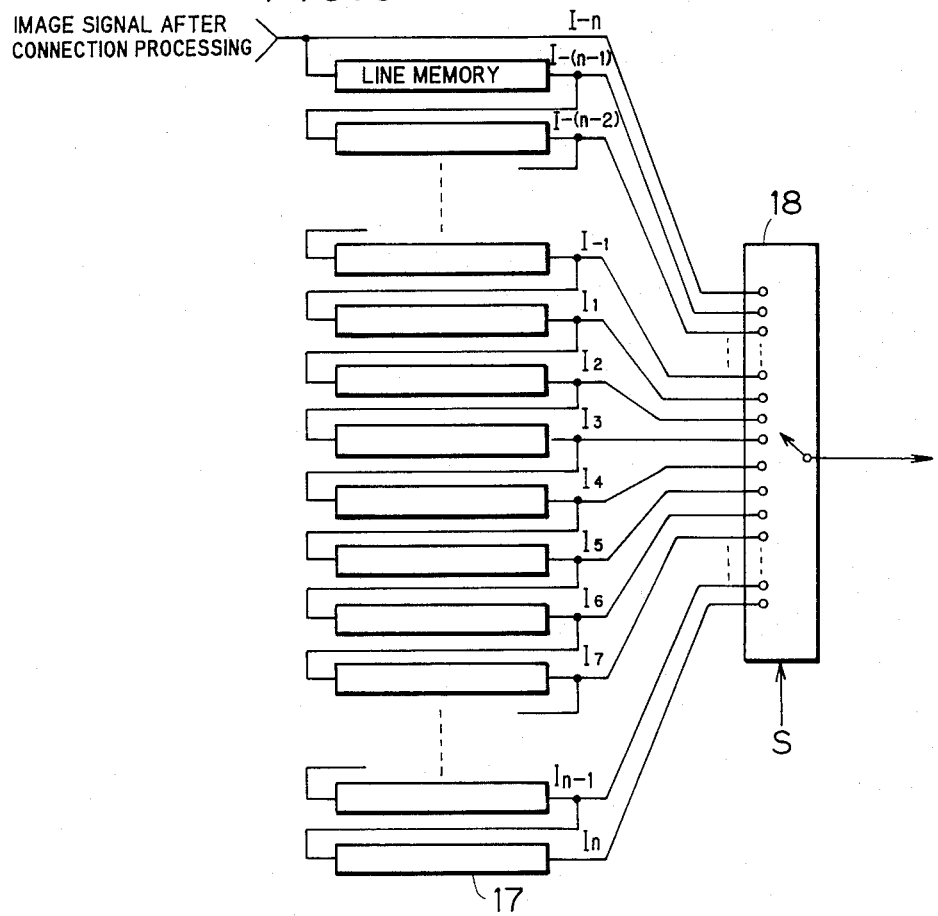
FIG. 9 is a block diagram showing a circuit for connecting irregularity of an image caused by angle deviation.

In scanning of an original (not shown) set on the original set table 5 shown in FIG. 2, the signals from the respective CCD's 1 to 3 are written in the respective image memories 13 to 15 enabled by the CPU 9, along addresses directed by the address counters 10 to 12 synchronized with the write clock CK1. FIG. 9 illustrates the status of writing in the image memories 13 to 15 in the case where the load values of the address counters 10 to 12 are "0", "−2A" and "−5A", respectively, i.e. in the case where $\Delta LINE_1$ corresponding to the correction amount $\Delta Y_1$ in FIG. 3 is −2 lines and $\Delta LINE_2$ corresponding to $\Delta Y_2$ is −5 lines. In this case, a signal read by the CCD 2 is obtained in delay by two lines from a read signal by the CCD 1 for the same point in a connecting portion between the CCD 1 and CCD 2, and hence a third line read signal of the CCD 2 may follow a first line read signal of the CCD 1, in order to corrected the read position error. Further, a read signal by the CCD 3 is obtained in delay by three lines from a read signal by the CCD 2 for the same point in a connecting portion between the CCD 2 and CCD 3, and hence a fourth line read signal of the CCD 3 may follow a first line read signal of the CCD 2, in order to correct the read position error. The load values "0", "−2A" and "−5A" of the address counters 10 to 12 are employed to perform such operation. Thus, connection processing along the subscanning direction is performed on the image memories 13 to 15 in response to the load values, as shown in FIG. 6.

In reading, the CPU 9 loads the address of an image signal to be read first in the address counter 16. Then, image signals are sequentially read from the image memories 13 to 15 along addresses directed by the address counter 16 synchronized with the read clocks CK2. For example, a first line read signal of the CCD 1, then a third line read signal of the CCD 2 and then a sixth line read signal of the CCD 3 are read in sequence, in response to count values 1 to 3A of the address counter 16.

FIG. 7 is an explanatory diagram of the result of the aforementioned connection processing in the subscanning direction. FIG. 7(a) illustrates positional relation between the CCD's 1 to 3 similarly to FIG. 3. Assuming that an original consisting of a straight line L shown in FIG. 7(b), which is parallel to the main scanning direction, is scanned by the CCD's 1 to 3. Image signals are interrupted in connecting portions as shown in FIG.

Figure 7A:
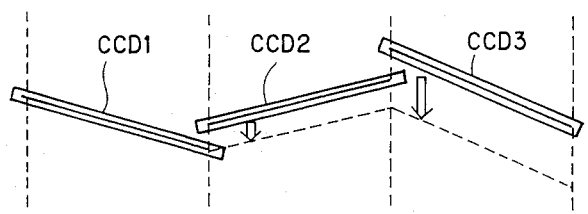
FIGS. 7A-7F are an explanatory diagram showing connection processing in the subscanning direction.
Figure 7B:
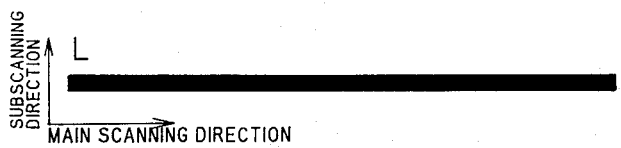
Figure 7C:
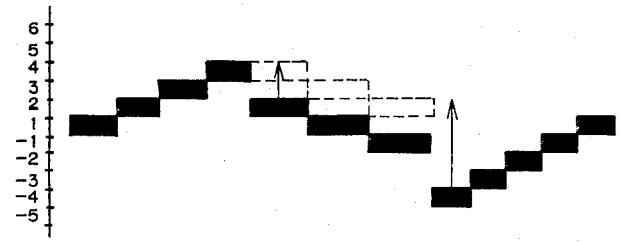
Figure 7D:
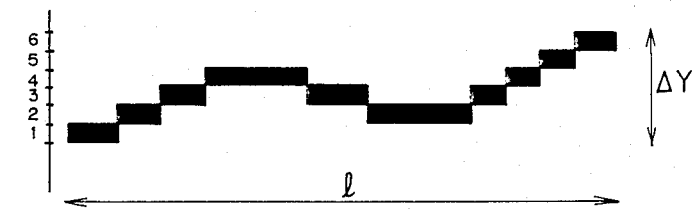

7(c), if no connection processing is performed in the subscanning direction. On the other hand, image signals with no interruption are obtained, as shown in FIG. 7(d), by performing the aforementioned connection processing in the subscanning direction to correct location errors in the connecting portions. Thus, the picture quality is improved.

When the correction amounts $\Delta Y_1$ and $\Delta Y_2$ are converted into the correction line numbers $\Delta LINE_1$ and $\Delta LINE_2$, the remainder of division by the scanning line pitch p is raised to a unit or omitted depending on whether it is in excess of or less than p/2 as hereinabove described, and hence errors of $\pm \frac{1}{2}$ line at the maximum are caused in the connecting portions. Although such errors are substantially inconspicuous, the picture quality can be further improved by employing a weighted means system of gradually mixing image signals of respective pixels in prescribed connecting blocks in a proportional distribution manner, as hereinafter described in detail with reference to FIG. 10.

Figure 7E:
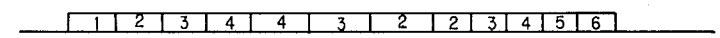
Figure 7F:

The image shown in FIG. 7(d), thus obtained, is substantially recognized as a straight line, since l is several 10 cm, whereas $\Delta Y$ is several 10 $\mu$m to several 100 $\mu$m at the utmost in practice. However, the image signals after connection processing may be further processed by a circuit shown in FIG. 9, in order to obtain a better image by correcting irregularity in the image caused by angle deviation of the CCD's 1 to 3. Referring to FIG. 9, image signals after connection processing are supplied to a group 17 of a plurality of serially connected line memories, so that an output signal from any of the line memories or an image signal not passing through the line memories is switched by a selector 18 and outputted. A switching signal S, the content of which is shown in FIG. 7(e), is supplied by the CPU 9. The selector 18 outputs image signals $I_1$ to $I_6$ in response to numbers 1 to 6 in FIG. 7(e), respectively. Timing for switching of the switching signal S can be recognized by dividing the effective pixel number A of the CCD's 1 to 3 by angle deviation line number n (line number corresponding to K in FIG. 8 as hereinafter described) of each of the CCD's 1 to 3. Namely, the image signals are relatively delayed sequentially by one line per A/n pixels. Obtained as the result is a straight line shown in FIG. 7(f), which is identical to the original. Such processing may be performed after the aforementioned connection processing, to extremely reduce the memory capacity to be prepared for the line memory group 17.

Figure 8:
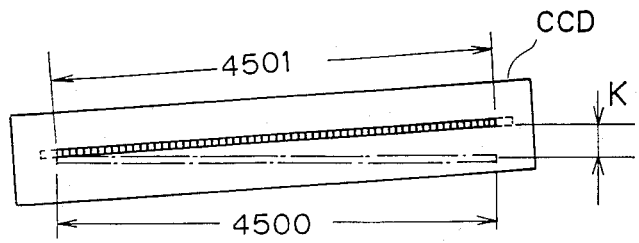
FIG. 8 is an explanatory diagram of a correction range.

Now, the degree of correctable angle deviation will be examined. Assuming that a CCD has effective bits of 4500, such effective bits of 4500 must be maintained, however inclined the CCD is. Referring to FIG. 8, the CCD is inclined to require 4501 bits for the same scanning point on an original when $$K = \sqrt{4501^2 - 4500^2} \approx 94 \text{ (pixels)}$$

and hence mechanical assembling accuracy for the CCD must be within 658 $\mu$m, assuming that one pixel is 7 $\mu$m□. The accuracy is preferably not more than 329 $\mu$m (x=47), the half in the above, in view of quantization errors. Namely, even though the CCD is erroneously obliquely located, correction can be relatively effectively performed if such location error is within 47 lines.

FIG. 10 illustrates another embodiment of connection processing in the main scanning direction. FIG. 11 illustrates timing thereof. FIG. 11(a) and FIG. 11(b) are identical to FIG. 7(a) and FIG 7(b). The following connecting methods are well known in the art:

(a) a method of subjecting one array output to voltage control amplification gradually changed from a constant value while subjecting the other array output of voltage control amplification gradually changed from zero to a constant value, in an overlappingly read connecting area, to add up respective amplification outputs, to thereby connect picture information between respective image pickup element arrays;

(b) a method of generating random numbers in a connecting area to switch signals of respective image pickup elements in response to the generated random numbers;

(c) a method of detecting pixels having small density change in a connecting area, to switch respective image pickup elements;

(d) a method of most simply switching respective image pickup elements in a predetermined position in an overlapping area to perform connection processing, as described with reference to FIG. 3 and FIG. 7.

Any of such connecting methods is performed in a connection processing circuit 27.

In this embodiment, all pixel data of the CCD's 1 to 3 are stored in the image memories 13 to 15 shown in FIG. 1 and FIG. 6. Overlapping parts are present in the image data, as shown by slanting lines in FIG. 11(c) and FIG. 11(d). Writing in the image memories 13 to 15 is performed in timing as shown in FIG. 11(c), and reading is performed in such timing that image data are necessarily present in portions of 1, as shown in FIG. 11(d), to output the image data to line memory units 20, 21 and 22 shown in FIG. 10.

In the line memory units 20 to 22, switching is performed by an electronic switch 24 at timing of FIGS. 11(e), 11(f) and 11(g) by outputs $S_1$ to $S_3$ of a timing controller 26, to output signals after switching to the connection processing circuit 27.

The connection processing circuit 27 performs any processing of the aforementioned items (a) to (d) in areas shown by slanting lines in FIG. 11(i). FIG. 11(h) illustrates an example of performing the simplest switching connection processing in a constant position. The connection processing circuit 27 outputs an image signal shown in FIG. 11(j).

An advantage of this embodiment is that various switching means (connection processing) are enabled while only the simplest switching in a constant position can be performed in the embodiment illustrated in FIG. 9.

Further, although the memories 13 to 15 require capacity larger than the pixel numbers of the CCD's 1 to 3, respectively, (however, since capacity for a memory is generally $2^n$ and an effective pixel signal number of a CCD is in conformity to $2^n$ as a rule, the memories 13 to 15 are not superfluously increased in capacity for the most part) in the embodiment illustrated in FIG. 1, the embodiment illustrated in FIG. 10 has such advantages that line memories 23a to 23d shown in FIG. 10 may be reduced in capacity to about $\frac{2}{3}$ of a single line memory shown in FIG. 9; and the number of the line memories 23a to 23d may be smaller by one than that of the line memories shown in FIG. 9 as obvious from comparison of FIGS. 7(d) and 11(d), and in general, the number of the line memories 23a to 23d may be within the number K described with reference to FIG. 8, although the line memories shown in FIG. 9 must be provided in a number three times K.

In consideration similar to that described with reference to FIGS. 2 to 5 in relation to the embodiment illustrated in FIG. 1, timing for writing in the memories 13 to 15, read timing and timing for writing in/reading from memory units 20 to 22 shown in FIG. 11 are obtained by the position error detecting memory 8 and the CPU 9 shown in FIG. 1.

While $P_1$ to $P_{10}$ shown in FIG. 3 are obtained from bilevel signals, in FIG. 4, values of $a_1$ to $a_{11}$ shown in FIG. 4 have levels if CCD outputs are extracted as signals having gradation, and more precise positional information can be read by judging the levels, to improve accuracy of the connecting positions.

Although the correction read patterns 6a and 6b of the correction reference chart 6 are formed by lines in the aforementioned embodiment, the same may be formed to detect boundary portions thereby by separate coating of different colors.

There is a well known method of projecting an original image to a plurality of line image sensors, which are intentionally deviated by a plurality of scanning lines in the subscanning direction in an offset manner, by utilizing a single lens to store signals from a sensor performing earlier scanning by the deviated scanning lines in a memory to time the same with signals from a sensor performing later scanning. It is obvious that the present invention is also applicable to such a method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of associating output image signals from a plurality of line image sensors, said sensors being arrayed along a main scanning line extending in a main scanning direction for scanning an original and obtaining image information, said method correcting any errors in the respective read positions of respective said line image sensors in a subscanning direction transverse to said main scanning direction, said method comprising the steps of:
   previously preparing a correction read pattern at least having a first pattern in which a subscanning direction coordinate of each portion of said first pattern is uniquely determinable with respect to a main scanning direction coordinate;
   placing said correction read pattern on a scanning plane, with a respective portion of said correction read pattern being adjacent to each of said line image sensors, in at least two points, for being scanned thereby;
   scanning said first pattern with said line image sensors, and determining an amount of a read position error in the subscanning direction between individual ones of said plurality of line image sensors, based on read pixel addresses detected by respective said line image sensors by said scanning of said first pattern by respective said line image sensors; and
   scanning said original, and asociating said output image signals from respective said line image sensors, by relatively delaying said output image signals with respect to each other as a function of a respective line number corresponding to any such read position error in the subscanning direction between said line image sensors.

2. A method in accordance with claim 1, further including the steps of:
   determining an amount of angle deviation of each of said plurality of line image sensors, based on said read pixel addresses detected by respective said line image sensors by said scanning of said first pattern by respective said line image sensors, as a function of a scanning line number unit, and
   performing correction of the angle deviation of relatively delaying said output image signals from respective said line image sensors sequentially by one line per A/n pixels (where A represents an effective pixel number of a respective one of said line image sensors and n represents said line number of the angle deviation), in scanning of said original.

3. A method in accordance with claim 2, wherein said step of performing correction of the angle deviation includes steps of:
   producing image signals obtained by delaying said output image signals of respective said line image sensors by 0 to n lines, and
   selecting said produced image signals every A/n pixels.

4. A method in accordance with claim 1, wherein said plurality of line image sensors are arrayed so that their respective adjacent read positions partially overlap with each other, and said correction read pattern further has a second pattern extending in said subscanning direction,
   said method further including a step of associating pixels of adjacent line image sensors in the main scanning direction to obtain connected image information, by making respective pixel addresses detected in reading of said second pattern by said adjacent line image sensors identical to each other.

5. A method in accordance with claim 4, wherein said first and second patterns are each formed by at least one respective thin line.

6. An apparatus for associating output image signals from a plurality of line image sensors, said sensors being arrayed along a main scanning line extending in the main scanning direction for scanning an original and obtaining image information, by correcting any errors in the respective read positions of respective said line image sensors in a subscanning direction transverse to said main scanning direction, said apparatus comprising:
   a correction read pattern at least having a first pattern in which a subscanning direction coordinate of each portion of said first pattern is uniquely determinable with respect to a main scanning direction coordinate, said correction read pattern being disposed on a scanning plane, with a respective portion of said correction read pattern being adjacent to each of said line image sensors, in at least two points, for being scanned thereby;
   means for determining an amount of a read position error in the subscanning direction between individual ones of said plurality of line image sensors, based on read pixel addresses detected by respective said line image sensors, respective to scanning of said first pattern by respective said line image sensors; and
   means for associating said output image signals from respective said line image sensors, by relatively delaying said output image signals with respect to one another as a function of a line number corresponding to any such read position error in the subscanning direction between individual ones of said line image sensors, in response to scanning of said original.

7. An apparatus in accordance with claim 6, further including:
means for determining an amount of angle deviation of each of said plurality of line image sensors, based on read pixel addresses detected by respective said lime image sensors in scanning of said first pattern by respective said line image sensors, as a function of a scanning line number unit, and
means for performing correction of the angle deviation by relatively delaying said output image signals from respective said line image sensors sequentially by one line per A/n pixels (where A represents an effective pixel number of a respective one of said line image sensors and n represents said line number of the angle deviation), in scanning of said original.

8. An apparatus in accordance with claim 7, wherein said means for performing correction of the angle deviation includes:
means for producing image signals obtained by delaying said output image signals of respective said line image sensors by 0 to n lines, and
means for selecting said produced image signals every A/n pixels.

9. An apparatus in accordance with claim 6, wherein said plurality of line image sensors are arrayed so that their respective adjacent read positions partially overlap with each other, and
said correction read pattern further has a second pattern extending in the subscanning direction,
said apparatus further including means for associating pixels of adjacent line image sensors in the main scanning direction to obtain connected image information, by making respective pixel addresses detected in reading of said second pattern by said adjacent line image sensors identical to each other.

10. An apparatus in accordance with claim 9, wherein said first and second patterns are each formed by at least one respective thin line.

11. An apparatus in accordance with claim 6, wherein said means for associating said output image signals from respective said line image sensors includes:
storage means for storing said output image signals, and
means for addressing write and read addresses of said storage means so that said output image signals read from said storage means are relatively delayed for respective ones of said line image sensors by a respective line number corresponding to said amount of the read position error in the subscanning direction.

* * * * *